United States Patent [19]

Drury et al.

[11] Patent Number: 5,046,296
[45] Date of Patent: * Sep. 10, 1991

[54] BULK MATERIAL PACKAGING APPARATUS

[75] Inventors: David J. Drury, Gainsborough; Norman Drury, Neat Brigg, both of United Kingdom

[73] Assignee: Wrap-A-Round Limited, Lincoln, England

[*] Notice: The portion of the term of this patent subsequent to Aug. 27, 2008 has been disclaimed.

[21] Appl. No.: 404,181

[22] Filed: Sep. 7, 1989

Related U.S. Application Data

[63] Continuation-in-part of Ser. No. 364,424, Jul. 27, 1989.

[30] Foreign Application Priority Data

Sep. 7, 1988 [GB] United Kingdom ................ 8821033

[51] Int. Cl.$^5$ ............................................. B65B 11/04
[52] U.S. Cl. ....................................... 53/211; 53/587; 242/66
[58] Field of Search ................ 53/118, 210, 211, 214, 53/215, 217, 587, 588, 589; 242/66, 68.7, 78.7

[56] References Cited

U.S. PATENT DOCUMENTS

| 1,869,545 | 8/1932 | Crafts | 242/66 |
|---|---|---|---|
| 2,461,387 | 2/1949 | Medbery | 242/66 |
| 2,635,401 | 4/1953 | Cook et al. | 53/215 X |
| 3,105,647 | 10/1963 | Maejima | 242/66 |
| 3,465,979 | 9/1969 | Henry et al. | 242/68.7 |
| 4,066,220 | 1/1978 | Beck et al. | 242/68.7 X |
| 4,281,500 | 8/1981 | Mueller et al. | 53/211 |
| 4,578,923 | 4/1986 | Petterson | 53/211 |
| 4,590,737 | 5/1986 | Rosenthal et al. | 53/587 X |
| 4,662,151 | 5/1987 | Mathes et al. | 53/211 |
| 4,685,270 | 8/1987 | Brambilla | 53/211 X |
| 4,688,374 | 8/1987 | Walker | 53/211 X |
| 4,807,427 | 2/1989 | Casteel et al. | 53/587 X |
| 4,815,369 | 3/1989 | Akins | 53/587 X |
| 4,819,408 | 4/1989 | Bertolotti | 53/211 |

FOREIGN PATENT DOCUMENTS

| 336739 | 10/1989 | European Pat. Off. | 53/588 |
|---|---|---|---|
| WO88/03896 | 6/1988 | PCT Int'l Appl. | |
| 2056401 | 3/1981 | United Kingdom | 53/211 |
| 2159489 | 5/1985 | United Kingdom | 53/211 |

Primary Examiner—John Sipos
Assistant Examiner—Linda B. Johnson
Attorney, Agent, or Firm—Locke Reynolds

[57] ABSTRACT

In a load wrapping apparatus of the kind which a load is wrapped by a wrapping strip of plastics material, which is delivered to a wrapping position from a reel to the load to be wrapped by producing relative rotational movement between the load and the strip material wherein extended area rotatable discs are arranged as to cooperate during the wrapping of a bale, with predetermined regions of a bale in the vicinity of its contact with the support table as to prevent displacement of the bale during the wrapping thereof. Conveniently the support for the load is mounted for rotation the bale about two axes at right angles to each other. Conveniently the rotatable discs comprise for each end of the load i.e., bale, a disc presenting a convex form towards the end regions of a bale being wrapped.

9 Claims, 2 Drawing Sheets

_5,046,296_

BULK MATERIAL PACKAGING APPARATUS

CROSS REFERENCE TO RELATED APPLICATIONS

This application is a continuation-in-part of application Ser. No. 07/364,424, filed July 27, 1989.

BACKGROUND OF THE INVENTION

This invention relates the packaging of bulk materials formed into a bale, pack or the like.

In particular, the present invention is concerned with but not restricted to the handling of baled material such as straw or silage or other material in like divided form for use as animal feedstock.

It has been proposed to wrap bales by means of a continuous strip of plastics material one of whose characteristics of use is that it has to be prestretched by an optimum amount in order that it will be effective as a bale wrapping material. The bale is wrapped in such manner that the baled material is effectively totally enclosed or shrouded in several layers of the plastics strip. To achieve the required wrapping it is necessary to wrap the bale in such manner that all air is excluded from the baled material and that respiration of the baled material is prevented.

In order to obtain and ensure the requisite air tightness the wrapping strip of plastics material, which is delivered to a wrapping position from a reel thereof, has to be maintained under a tension controlled within predefined limits. In addition, in order to achieve the total plastics enclosure it has been found necessary to be able to rotate the bale about two axes at right angles to each other. In the case of the so-called 'big' bale which has a cylindrical shape it is necessary to rotate the bale about its longitudinal axis and also about a second axis transverse to the longitudinal axis and passing through the centre of the bale. In addition, the rotation of the bale in these two directions of rotations is such that the each part of the surface thereof is progressively moved into a setting in which it can be brought into the wrapping position. It is also to be noted that the preferred wrapping technique is in the end-to-end sense accompanied with rotation of the bale through a predetermined angle about its longitudinal axis at the finish of each end-to-end complete rotation.

It has been found in practice, particularly when wrapping mis-shapen and/or loosely packed bales that difficulties arise in maintaining the bale in the optimum position during the wrapping operation.

It is an object of the invention to provide improved apparatus for wrapping such baled material.

SUMMARY OF THE INVENTION

According to a first aspect of the invention there is provided in a load wrapping apparatus of the kind which a load is wrapped whilst being supported by a rotatable support table by means of a wrapping strip of plastics material, which is delivered to a load wrapping position from a reel by producing relative rotational movement between the load and the strip material supply, the provision of extended area rotatable means arranged as to cooperate during the wrapping of a load with predetermined regions of a load as to prevent displacement of the load during the wrapping thereof.

According to a second aspect of the invention there is provided a load wrapping apparatus including a main frame; a load receiving support rotatable with respect to the main frame; means for enabling rotation of a load when on the load receiving support; means for receiving a supply of strip form wrapping material from a supply; means for enabling controlled delivery of the wrapping material for application to the load for the purposes of the wrapping thereof; extended area rotatable means arranged so as to cooperate during the wrapping of a load with predetermined regions of a load in such manner as to prevent undesired displacement of the load during the wrapping thereof.

Preferably the rotatable means comprise for each end of the load i.e., bale, a disc presenting a adished, generally oblately convex form towards the end regions of a bale during the wrapping of the latter.

Conveniently, the load support means is so pivotally mounted to the main frame that the support means can be tilted to discharge a wrapped load with said disc means serving as guides for the bale during the discharge thereof, and wherein the braking means is adapted so as to have an additional function of tilting the support means when it is required to discharge a load.

In accordance with a further aspect of the invention there is provided a method for controlling the tensioning of strip material including the step of interposing a friction braking arrangement in the feed path of the strip material from a supply thereof to a utilisation location.

Preferably, the friction braking arrangement includes a roller arranged to be driven by movement of the strip material from a supply to a location of use, and a friction brake for constraining the freedom of rotation of the roller rotation.

For a better understanding of the invention and to show how to carry the same into effect reference will now be made to the accompanying drawings.

DESCRIPTION OF THE PREFERRED EMBODIMENT

Figure 1:
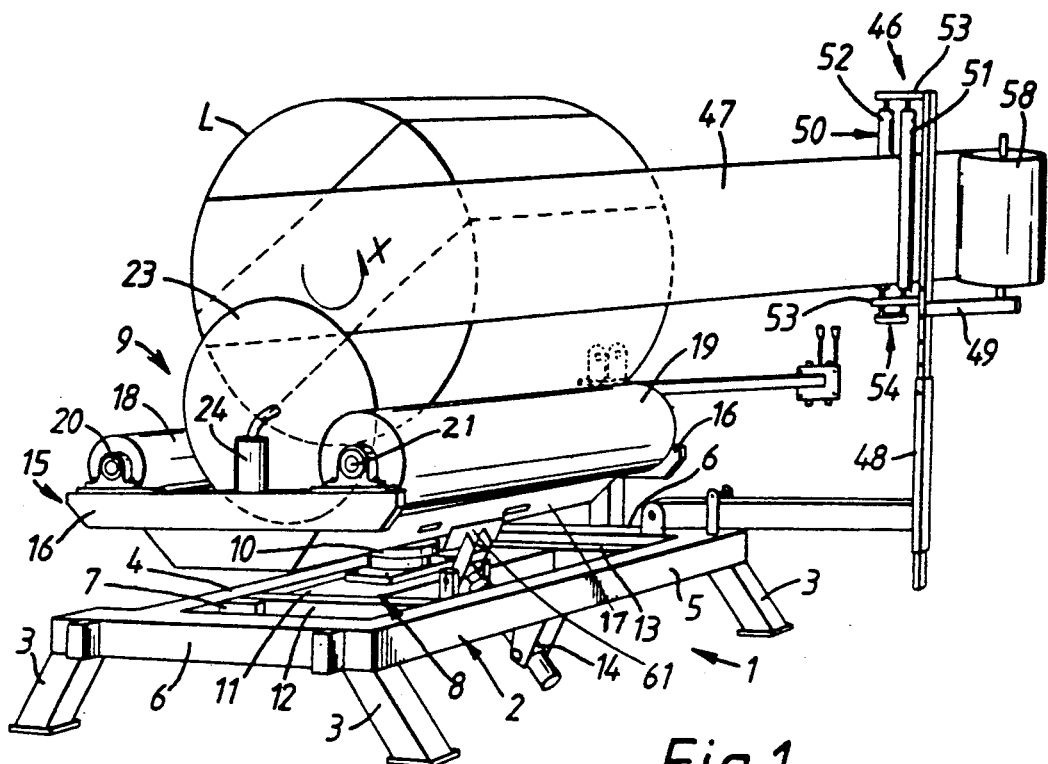
FIG. 1 is a schematic perspective view of a first embodiment of apparatus for enabling the wrapping of a load such as a bale of straw or hay, the figure illustrating a load support means enabling rotation of the load about two axes transverse to each other.

Referring now to the drawings these illustrate a load wrapping apparatus incorporating a rotatable load supporting turntable assembly 1 mounted for rotation upon a generally rectangular base frame 2 supported by legs 3.

If the apparatus is to be towable by a tractor or the like the frame 2 will be adapted for mounting wheels (not shown) and, if necessary, the legs 3 will be pivotal between a frame support setting shown in the figures and a stowed or towing position (not shown). To facilitate such towing the frame is provided with a tractor connecting or hitching assembly (not shown).

The base frame 2 includes side rails 4 and 5 and end rails 6. The side rail 4 is spaced inwards of the associated ends of the end rails 6, and is provided with sets of mounting lugs or the like 7 (only one set being indicated) for mounting for pivotable movement about a horizontal axis a tiltable platform 8 upon which a turntable unit 9 is rotatably mounted so that the turntable unit 9 can be rotated by a drive unit 10 about a vertical axis when the tiltable platform 8 is in the position shown in FIG. 1.

Figure 2:
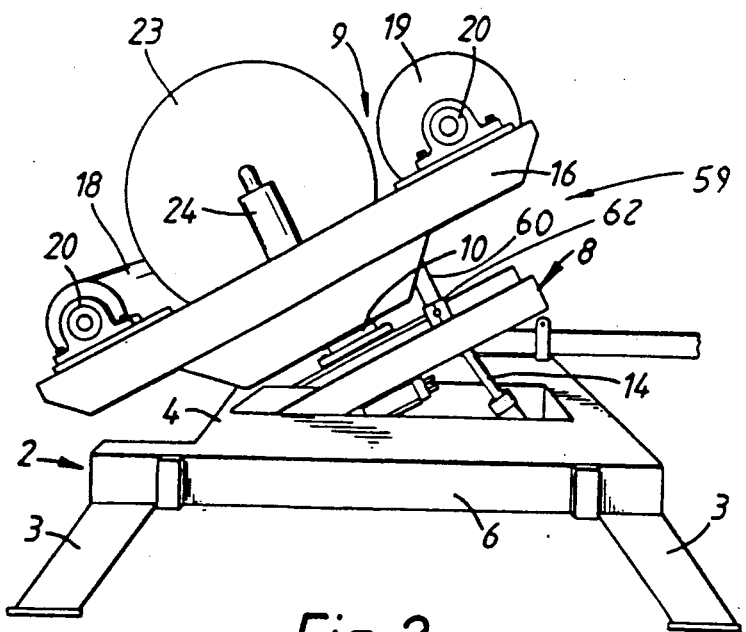
FIG. 2 is an oblique view of the apparatus of FIG. 1 illustrating the apparatus when in an intermediate setting, as arises during unloading of a wrapped load from the apparatus.

The turntable unit 9 incorporates a main support section 11 which mounts (as will be considered hereinafter) the drive unit 10. The section 11 is supported from two frame members 12, 13 which are pivotally connected to the lugs or the like 7 so that the platform 8 is pivotable about the horizontal axis between a horizontal setting as shown in FIG. 1 and an inclined position in which any load 'L' that may be on the turntable assembly can be readily discharged from the assembly. FIG. 2 illustrates an intermediate position of the tiltable platform 8. The tilting is conveniently effected by means of a hydraulic or pneumatic ram arrangement 14.

The turntable unit 9 incorporates a frame structure 15 including a pair of end rails 16 connected a central main section 17 providing an upper surface of a generally rectangular overall shape, the conection being such that the end rails 16 effectively form with the central section 17 and H formation.

Rolls 18 and 19 are rotatably mounted to the projecting ends 20 of the rails 16 by way of bearing units 21 provided upon the projecting ends 20. A drive arrangement is provided for transmitting drive from the drive unit 10 to the rolls 18 and 19. The two rolls 18 and 19 have different diameters and are mounted so that their axes of rotation lie in the same plane. The drives to the rolls is such that they rotate at matched peripheral speeds. By providing the differently sized rolls it has been found that if the larger diameter roll 19 is effectively the lead roll in terms of rotation of the load L i.e., bale to be wrapped whilst the load is being wrapped the load is bodily displaced towards the smaller roll 18. That is to say the centre of weight of the load is offset towards the axis of rotation of the smaller roll from the effective or true centre line of the two rolls.

In practice, it has been found that with this arrangement any tenancy for the load to climb up the rolls 18 and 19 during the load wrapping procedure is eliminated so that the stablility of the load 'L' during wrapping is maintained.

The rolls 18 and 19 can, if desired, carry an an endless belt or group of belts (not shown) if it is desired to provide a flexible support platform for a load 'L' to be wrapped (which latter is only very schematically shown in the figures). With this arrangement loads i.e., bales, of various sizes and shapes can be carried by the turntable unit 9. The rate of rotation of the roll pair is related to the rate of rotation of the turntable unit 9. The turntable unit 9 is rotated from the motor drive unit 10 which is mounted to the support frame so that when the turntable platform 8 is tilted the motor moves with the turntable.

Figure 3:
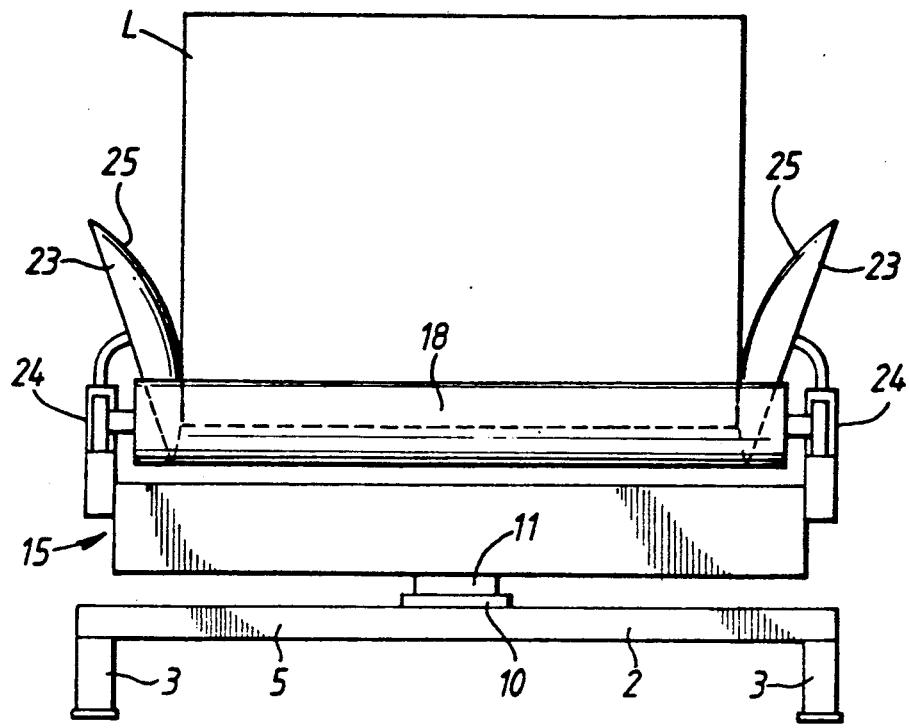
FIG. 3 is a highly schematic figure specifically illustrating a bale wrapping apparaus incorporating the features of the present invention.
Figure 4:
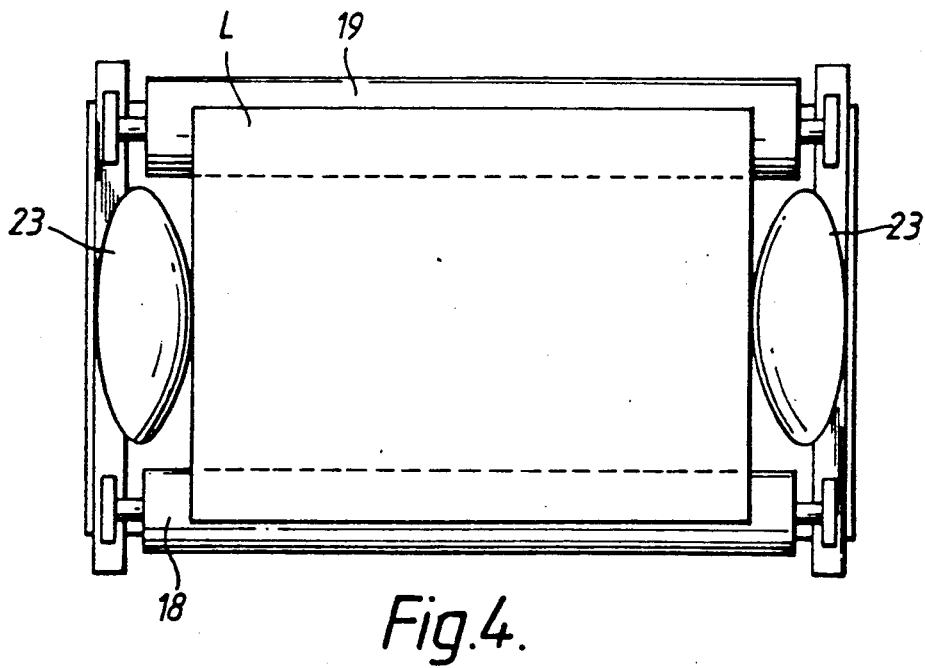
FIG. 4 is a plan view of the apparatus of FIG. 3.

The load 'L' is restrained against axial displacement during the wrapping thereof by providing at each end of the load 'L' an extended area rotatable means 23 such as a disc. Each disc 23 is rotatably mounted from a support element 24, and each disc is dished shaped so as to present a generally oblately convex surface 25 towards the load. The discs are so mounted that they cooperate with the lower regions of the load as may be seen from the FIGS. 1, 3 and 4. In practice, it is desirable for the lowermost parts of the dish-shaped discs to be below the level of the rolls 18 and 19 so that the discs are able to co-operate with the lowermost regions of the ends of the load 'L' during the wrapping thereof as shown in FIG. 4.

The discs 23 are set at such angle to the vertical as to be able satisfactorily to impede any axial displacement of a load, to accommodate mis-shapen loads and those which have been too loosely baled-up.

Furthermore, the rotation of the discs has been found to eliminate or at least significantly reduce the risk of damage to the rotating load during the wrapping processes. In practice, it has been found that an inclination of sixty degrees to the vertical as shown in FIG. 4, is a suitable and optimum angle of inclination.

The discs can be so mounted that the angle of overall inclination thereof to the vertical can be selectively adjusted according to requirements. If desired, the mounting arrangements 24 for the discs can be such as to permit the axes of rotation to be raised or lowered.

In practice, the rates of rotation of the turntable unit 9 and that of the rolls 18 and 19 are so inter-related that the rate of rotation of the unit 9 about the vertical axis is considerably greater than that about the horizontal axis so that during a complete revolution about the vertical axis the load 'L' is effectively stepped through a relatively small angular amount, for example, 5 to 10 degrees of arc about the horizontal axis so that by the time a load 'L' has been effectively fully enclosed in the plastics material the load is encased in several layers of the plastic material.

At the completion of a wrapping operation the drive to the turntable 9 is stopped via a braking mechanism 59, which makes use of the hydraulic or pneumatic ram 14 provided for tilting the platform 8. The ram arrangement 14 is additionally connected to control movement of a pivoted brake lever member 60 carrying a braking pad 61. The lever is pivoted to a convenient location 62 on the tiltable platform 8 as to be displacable by the ram arrangement 14 between a position in which the turntable unit 9 is free to rotate, and a braking position in which the pad 61 engages with the turntable unit 9 to prevent rotation thereof.

Since it is desired to be able to wrap the load 'L' with a continuous length of plastics strip the apparatus includes a support and dispenser unit 46 for the stretchable strip plastics wrapping material 47. The unit 46 includes a main support post structure 48 which is lengthwise adjustable and which carries a mounting arbour 49 for receiving a reel or drum 58 of the stretchable plastics strip material 47.

As so far discussed the strip material 47 is pulled from the reel 58 thereof by the rotational movement of the load 'L'. As indicated above it is important to ensure that the wrapping material 47 is maintained at or within a specified tension range so as to ensure that the requisite prestretching and thus tightness of wrapping of the load is achieved. To ensure that the material will be fed to the wrapping region at the optimum tension required for the pre-stretching of the plastics material as the latter is passed through the tension control device 50, the latter includes rolls 51 and 52 carried by upper and lower support elements 53. The roll 51 is a driven roll in the sense that it is caused to rotate as a direct consequence of pull being exerted thereupon by the material being fed to the load 'L' to be wrapped. The roll 52 is an idler roll. It should be noted that, if desired, idler rolls (not shown) can be provided. The rate of rotation of the driven roll determines the tension produced in the wrapping material.

The support post is so mounted that it is movable to a stowed position when not required for use, and also if thought necessary positionable in an alternative operation position.

In order that the tension can be controllably varied a friction braking arrangement is provided for enabling the selective tension control. This friction brake arrangement involves a flywheel constrained to rotate at the speed of the driven roll 18, and an eccentric cam connected to receive drive from the flywheel by way of a a friction brake drive which remains at rest. The cam is selectively rotatable about an axis parallel to that of the flywheel and thus the driven roller. With this arrangement the rate of rotation of the roll 18 can be adjusted by rotation of the eccentric cam which rotation varies the braking tension in the belt and thus the possible rate of rotation of the roll in relation to a strip material pull-off tension. Since the plastics strip filmlike material is being pulled away from the reel at a rate set by the rate of rotation of the turntable it will be apparent that by braking the pull-off from the reel of plastics material (by controlling the rate of rotation of the feed roll 18), the plastics strip will be tensioned by an amount related to the braking effect produced. Hence, the tension in the plastics strip will be altered according to alteration of the rotation rate of the driven roll 18.

It will be appreciated that whilst a particular reference has been made to the wrapping of bales other forms of load could be so wrapped.

Furthermore, it will be appreciated that the features of the invention can be utilised in the wrapping of a load that is rotated about a single axis only. With this application the discs 23 are arranged to engage with the ends of the of the roll whilst the body of the roll is being wrapped.

In a further variation the disc 23 can have a perforated surfaces.

If thought necessary or convenient the load engaging surface of the discs 23 can be covered with any suitable material which assists in avoiding undesired slip between the load and the load engaging surfaces of the discs.

We claim:

1. Apparatus for wrapping a load with wrapping material comprising:
   a frame, a platform, pivot means pivotally connecting the platform to the frame about a horizontal axis to permit the platform to be tilted between a generally horizontal position and an inclined position, and tilting means for tilting the platform with respect to the frame about the axis defined by said pivot means;
   a load support, turning means mounting the load support to the platform to permit the load support to be turned about a turning axis perpendicular to the platform, and load rotating means mounted on the load support for rotating said load about a rotating axis transverse to the turning axis;
   dispensing means selectively positionable with respect to the frame for dispensing a strip of wrapping material to wrap said load as the load is rotated by the load rotating means and as the load support is turned with respect to the platform;
   arresting means coupled to said tilting means for arresting the turning of the load support at a preselected position with respect to the platform prior to the tilting of the platform with respect to the frame to discharge the load; and
   extended area rotatable means coupled to the load support for contacting predetermined regions of a load as the load and load support turn about the turning axis to prevent displacement of the load on the load support.

2. The apparatus of claim 1 wherein the extended area rotatable means comprises disc means presenting a convex surface towards the predetermined regions of the load on the load support.

3. The apparatus of claim 2 wherein the disc means includes a perforated surface.

4. The apparatus of claim 2 wherein the convex surface of the disc means comprises a material which assists in avoiding slip between the load and the disc means.

5. The apparatus of claim 2 further comprising support elements for mounting the disc means to the load support at an inclined angle with respect to vertical.

6. The apparatus of claim 5 further comprising means for adjusting the inclined angle of the disc means with respect to the load support.

7. The apparatus of claim 5 further comprising means for adjusting the height of the disc means with respect to the load support.

8. The apparatus of claim 2 wherein the disc means is situated at both ends of the load support and downwardly offset with respect to the load rotating axis.

9. Apparatus for wrapping a load with wrapping material comprising:
   a frame, a platform, and pivot means pivotally connecting the platform to the frame about a horizontal axis to permit the platform to be tilted between a generally horizontal position and an inclined position;
   a load support, turning means mounting the load support to the platform to permit the load support to be turned about a turning axis perpendicular to the platform, and load rotating means mounted on the load support for rotating said load about a rotating axis transverse to the turning axis;
   extended area rotatable means coupled to the load support for contacting predetermined regions of the load to prevent displacement of the load on the load support;
   dispensing means selectively positionable with respect to the frame for dispensing a strip of wrapping material to wrap said load as the load is rotated by the load rotating means and as the load support is turned with respect to the platform;
   arresting means for arresting the turning of the load support at a preselected position with respect to the platform, the arresting means comprising a lever having a first end pivoted to the platform and a second end adapted to contact the load support; and
   tilting means for tilting the platform with respect to the frame about the axis defined by said pivot means, the tilting means comprising an extensible ram having a first end coupled to the frame and a second end coupled to said lever intermediate the first and second ends, the extensible ram being extensible among a retracted position wherein the lever second end is disengaged from the load support and the platform is horizontal, an intermediate position wherein the lever second end engages the load support to prevent turning thereof, and a third position wherein the platform is tilted with respect to the frame to discharge the load.

* * * * *